US010281176B2

United States Patent
Mun et al.

(10) Patent No.: US 10,281,176 B2
(45) Date of Patent: May 7, 2019

(54) MAGNETIC COOLING APPARATUS AND MAGNETIC REFRIGERATING SYSTEM HAVING THE SAME

(71) Applicant: Samsung Electronics Co., Ltd., Suwon-si (KR)

(72) Inventors: Il Ju Mun, Suwon-si (KR); Min Soo Kim, Seoul (KR); Woo Hyek Choi, Yongin-si (KR); Keon Kuk, Yongin-si (KR); Jin Han Kim, Suwon-si (KR); Hyun Woo Yu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 549 days.

(21) Appl. No.: 14/579,186

(22) Filed: Dec. 22, 2014

(65) Prior Publication Data
US 2015/0184903 A1 Jul. 2, 2015

(30) Foreign Application Priority Data

Dec. 27, 2013 (KR) .......................... 10-2013-0166223

(51) Int. Cl.
*F25B 21/00* (2006.01)

(52) U.S. Cl.
CPC .......... *F25B 21/00* (2013.01); *F25B 2321/00* (2013.01); *F25B 2321/0021* (2013.01); *F25B 2321/0022* (2013.01); *Y02B 30/66* (2013.01)

(58) Field of Classification Search
CPC ................ F25B 21/00; F25B 2321/002; F25B 2321/0022; F25B 2321/0021
See application file for complete search history.

(56) References Cited

U.S. PATENT DOCUMENTS

| 3,125,861 | A | * | 3/1964 | Jaep ........................ F25B 21/00 |
| | | | | 62/3.7 |
| 5,771,961 | A | | 6/1998 | Alizadeh |
| 2008/0223853 | A1 | | 9/2008 | Muller et al. |
| 2010/0236258 | A1 | | 9/2010 | Heitzler et al. |
| 2010/0300118 | A1 | | 12/2010 | Heitzler et al. |
| 2011/0041514 | A1 | | 2/2011 | Heitzler et al. |

(Continued)

FOREIGN PATENT DOCUMENTS

| CN | 101842647 A | 9/2010 |
| CN | 102016452 A | 4/2011 |

(Continued)

OTHER PUBLICATIONS

International Search Report dated Apr. 3, 2015 in International Patent Application No. PCT/KR2014/012711.

(Continued)

*Primary Examiner* — David J Teitelbaum
(74) *Attorney, Agent, or Firm* — Staas & Halsey LLP

(57) ABSTRACT

A magnetic cooling apparatus may include a fixing module and a rotation module rotatably provided at the fixing module. The fixing module includes a plurality of magnetic regenerators and a thermal fluid supply apparatus allowing thermal fluid to exchange with the plurality of magnetic regenerators, and the thermal fluid supplying apparatus is configured to operate by the rotation module without an additional configuration, which enables the magnetic cooling apparatus to have a similar configuration.

33 Claims, 10 Drawing Sheets

(56) References Cited

U.S. PATENT DOCUMENTS

2011/0192836 A1    8/2011    Muller et al.
2011/0215088 A1    9/2011    Muller et al.
2013/0237062 A1*  9/2013    Winniczek ........ H01L 21/30655
                                                                                                                   438/719

FOREIGN PATENT DOCUMENTS

| CN | 102165615 A | 8/2011 |
|---|---|---|
| JP | 2002-106999 | 4/2002 |
| KR | 10-2010-0087140 | 8/2010 |
| SU | 1638493 | 3/1991 |
| WO | 03/016794 | 2/2003 |
| WO | 2013/109029 | 7/2013 |

OTHER PUBLICATIONS

European Search Report dated Jun. 12, 2015 in corresponding European Patent Application No. 14200479.5, 6 pages.
Canadian Office Action dated May 4, 2017 in corresponding Canadian Patent Application No. 2,933,176, 3 pages.
Notice of Allowance dated Jan. 18, 2018, in corresponding Canadian Patent Application No. 2,933,176, 1 pg.
Office Action dated Apr. 2, 2018, in corresponding Chinese Patent Application No. 201480070959.0, 13 pgs.
Chinese Office Action (Notification of Due Registration Formalities) dated Nov. 5, 2018 in corresponding Chinese Patent Application No. 201480070959.0 (4 total pages).

\* cited by examiner

MAGNETIC COOLING APPARATUS AND MAGNETIC REFRIGERATING SYSTEM HAVING THE SAME

CROSS-REFERENCE TO RELATED APPLICATIONS

This application claims the priority benefit of the Korean Patent Application No. 10-2013-0166223, filed on Dec. 27, 2013, in the Korean Intellectual Property Office, the disclosure of which is incorporated herein by reference.

BACKGROUND

1. Field

Embodiments relate to a magnetic cooling apparatus configured to execute cooling by use of characteristics of magnetic thermal material and a magnetic refrigerating system having the same.

2. Description of the Related Art

A magnetic cooling apparatus is referred to as a cooling apparatus configured to use the characteristics of magnetic thermal materials provided with temperature thereof increasing when a magnetic field is applied and decreasing when a magnetic field is removed, and is also referred to as a new cooling apparatus capable of substituting a conventional cooling apparatus configured to use an air compression cycle.

A general magnetic cooling apparatus includes a magnetic regenerator having magnetic thermal materials, a magnet configured to apply a magnetic field at the magnetic regenerator or remove a magnetic field from the magnetic regenerator, a heat exchanging unit provided such that thermal fluid passed through the magnetic regenerator may heat-absorb the heat of outside air or radiate heat to outside air, a transport pipe connecting the magnetic regenerator and the heat exchanging unit, and a driving motor configured such that a magnetic field may or may not be applied to the magnetic regenerator by having one of the magnet and the magnetic regenerator rotated.

SUMMARY

In an aspect of one or more embodiments, there is provided a magnetic cooling apparatus configured to be structured in further compact size, and a magnetic refrigerating system having the same.

In an aspect of one or more embodiments, there is provided a magnetic cooling apparatus which includes a fixing module and a rotation module. The rotation module may be configured to rotate with respect to the fixing module, wherein the fixing module may include a plurality of magnetic regenerators, and a thermal fluid supplying apparatus configured to be operated by the rotating module and allowing a thermal fluid to exchange heat with the plurality of magnetic regenerators.

The fixing module may include a first heat exchanger installed at one side of the fixing module and configured to receive cool air through the thermal fluid, and a second heat exchanger installed at an outer circumferential side of the fixing module and configured to receive heated air through the thermal fluid.

The thermal fluid supplying apparatus may include a first flow path allowing a thermal fluid to be delivered from the magnetic regenerator to the first heat exchanger, a second flow path allowing a thermal fluid to be delivered from the magnetic regenerator to the second heat exchanger, and an actuator allowing a thermal fluid to flow through the first flow path and the second flow path.

The actuator may be configured to flow the thermal fluid of a magnetic regenerator applied with a magnetic field among the plurality of magnetic regenerators to the second heat exchanger, and configured to flow the thermal fluid of a magnetic regenerator not applied with a magnetic field among the plurality of magnetic regenerators to the first heat exchanger.

The first flow path provided in two units thereof and extended from inner side ends of two adjacent magnetic regenerators among the plurality of magnetic regenerators may be connected to each other at the first heat exchanger. The second flow path may be provided in two units thereof and one of the second flow paths extended through the second heat exchanger from an outer side end of one of the two adjacent magnetic regenerator is connected to an outer side end of the actuator; and the other one of the second flow paths extended through the second heat exchanger from an outer side end of the other one of the two adjacent magnetic regenerator may be connected to an inner side end of the actuator.

The rotation module may include a rotation member formed in the shape of a ring, and a cam unit provided at an inner surface of the rotation member, and the actuator may be driven by the cam unit.

The cam unit may be provided with a crest portions and a trough portion thereof alternately formed from an inner circumferential surface of the rotation member in a circumferential direction of the cam unit.

The actuator may include a cylinder disposed in a radial direction at the fixing module, and a piston movably installed at the cylinder.

The cam unit may include a guide rail provided in a circumferential direction thereof, and the piston may include a guide unit inserted into and hooked at the guide rail.

The guide unit may be formed in the shape of a sphere, and the guide rail may be formed in the shape of a groove having a circular cross section as to correspond to the guide unit.

The fixing module may include a fixing member formed in the shape of a circular panel and allowing the plurality of magnetic regenerators installed thereon while being spaced apart each other in a circumferential direction of the fixing module, and the rotation module may include a magnetic flux generating apparatus configured to apply a magnetic flux to the plurality of magnetic regenerators while disposed at an inner circumferential surface of the rotation member.

The magnetic flux generating apparatus may include a magnet configured to generate magnetic field and a magnetic flux guide unit formed in the shape of a letter C and provided with the magnet installed at an inner side thereof, and the fixing member may be disposed while spaced apart from the magnet and the magnetic flux guide unit.

The fixing member may further include a plurality of coils alternately disposed with the plurality of magnetic regenerators in a circumferential direction, and the rotation module may be configured to be rotated according to interaction between the coil and the magnetic flux generating apparatus.

The fixing module may include a plurality of first heat exchangers configured to receive cool air, and a plurality of second heat exchangers configured to receive heated air, and the plurality of first heat exchangers and the plurality of second heat exchangers may be alternately disposed at an outer circumferential side of the fixing module in a circumferential direction.

The plurality of magnetic regenerators may include at least one first magnetic regenerator configured to cool thermal fluid and at least one second magnetic regenerator configured to heat thermal fluid, and the thermal fluid supplying apparatus may include a first flow path connecting an outer side end of the first magnetic regenerator to the first heat exchanger, a second flow path connecting an outer side end of the second magnetic regenerator to the second heat exchanger, a third flow path extended from inner side ends of the first magnetic regenerator and the second magnetic regenerator, a first actuator configured as to flow thermal fluid though the first flow path, a second actuator configured as to flow thermal fluid though the second flow path, and a third actuator connected to the third flow path, which is provided in two units thereof and extended from the first magnetic reregenerator and the second magnetic regenerator that are adjacent to each other.

The rotation module may include a rotational shaft and a rotation member formed in the shape of a ring, and the rotation member may include a first cam unit protruded from an inner surface thereof and provided with crest portions and trough portions thereof alternately formed in a circumferential direction, and the rotational shaft may include a second cam unit protruded from an outer surface thereof and provided with crest portions and trough portions thereof alternately formed in a circumferential direction.

The first actuator and the second actuator may be driven by the first cam unit, and the third actuator may be driven by the second cam unit.

The first actuator may be configured to flow thermal fluid to the first flow path when a magnetic field is not applied to the first magnetic regenerator, the third actuator may be configured to flow thermal fluid to the third flow path when a magnetic field is applied to the first magnetic regenerator, the second actuator may be configured to flow thermal fluid to the second flow path when a magnetic field is applied to the second magnetic regenerator, and the third actuator may be configured to flow thermal fluid to the third flow path when a magnetic field is not applied to the second magnetic regenerator.

The third actuator may be configured to mix the thermal fluid being delivered from the two units of third flow paths connected to the first magnetic regenerator and the second magnetic regenerator.

The first actuator and the second actuator may be configured to simultaneously draw and discharge thermal fluid, and the third actuator may be configured to draw and discharge thermal fluid in contrary with the first actuator and the second actuator.

The first actuator, the second actuator, and the third actuator each may include a cylinder disposed in a radial direction at the fixing module and a piston movably installed at the cylinder.

The first cam unit and the second cam unit each may include a guide rail provided in a circumferential direction, and the piston provided at each of the first actuator, the second actuator, and the third actuator may include a guide unit inserted into and hooked at the guide rail.

The guide unit may be formed in the shape of a sphere, and the guide rail may be formed in the shape of a groove having a circular cross section as to correspond to the guide unit.

The fixing module may include a fixing member formed in the shape of a circular panel and having the plurality of magnetic regenerators installed thereon in a circumferential direction. The rotation module may include a magnetic flux generating apparatus disposed at an inner circumferential surface of the rotation member and configured to apply a magnetic flux to the plurality of magnetic regenerators.

The fixing member may further include a plurality of coils alternately disposed with the plurality of magnetic regenerators in a circumferential direction, and the rotation module may be configured to be rotated according to interaction between the plurality of coils and the plurality of magnetic flux generating apparatuses.

In an aspect of one or more embodiments, there is provided a magnetic refrigerating system which includes a plurality of units of the magnetic cooling apparatus, and the plurality of magnetic cooling apparatuses are serially disposed in an axial direction of the magnetic refrigerating system.

Each of the plurality of magnetic cooling apparatuses may be provided with a different temperature range of operation.

In an aspect of one or more embodiments, there is provided a magnetic refrigerating system which includes a plurality of units of the magnetic cooling apparatus, and the plurality of magnetic cooling apparatuses are parallelly disposed as to be positioned at side directions with respect to each other.

In an aspect of one or more embodiments, there is provided a magnetic cooling apparatus which includes a fixing module and a rotation module. The rotation module may be configured rotate with respect to the fixing module. The fixing module may include a plurality of magnetic regenerators disposed while spaced apart from each other in a circumferential direction, a first heat exchanger disposed at a central portion of the plurality of magnetic regenerators and configured to receive thermal fluid that is cooled at the magnetic regenerator, a second heat exchanger disposed at an outer circumferential side of the fixing module and configured to receive thermal fluid that is heated at the magnetic regenerator, and a thermal fluid supplying apparatus allowing fluid to be delivered from the magnetic regenerator to the first heat exchanger and the second heat exchanger. The thermal fluid supplying apparatus may include a first flow path connecting the magnetic regenerator to the first heat exchanger, a second flow path connecting the magnetic regenerator to the second heat exchanger, and an actuator allowing thermal fluid to flow through the first flow path and the second flow path.

In an aspect of one or more embodiments, there is provided a magnetic cooling apparatus which includes a fixing module and a rotation module. The rotation module may be configured to rotate with respect to the fixing module. The fixing module may include a plurality of first magnetic regenerators and a plurality of second magnetic regenerators alternately disposed with respect to each other in a circumferential direction thereof, a plurality of first heat exchangers provided to receive cooled thermal fluid from the first magnetic regenerator, a plurality of second heat exchangers provided to receive heated thermal fluid from the second magnetic regenerator, and a thermal fluid supplying apparatus allowing thermal fluid to be delivered to each of the first heat exchanger and the second heat exchanger from the plurality of first magnetic regenerators and the plurality of second magnetic regenerators. The thermal fluid supplying apparatus may include a first flow path connecting an outer side end of the first magnetic regenerator to the first heat exchanger, a second flow path connecting an outer side end of the second magnetic regenerator to the second heat exchanger, a third flow path extended from inner side ends of the first magnetic regenerator and the second magnetic regenerator, a first actuator allowing thermal fluid to flow through the first flow path, a second actuator allowing thermal fluid to flow through the second flow path, and a third actuator connected to the third flow path which is provided in two units thereof and extended from the first magnetic regenerator and the second magnetic regenerator that are adjacent to each other.

As described above, a rotation module may be rotated through a plurality of coils configured to interact with magnets configured to apply a magnetic force to a magnetic regenerator, and thus a structure as to rotate the magnets is further simplified.

In addition, the actuator operates as a piston of an actuator is moved forward/backward by a cam unit provided at the rotation module according to rotations of the rotation module, and thus an additional structure as to drive the actuator may be removed, and thereby the structure is further simplified.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
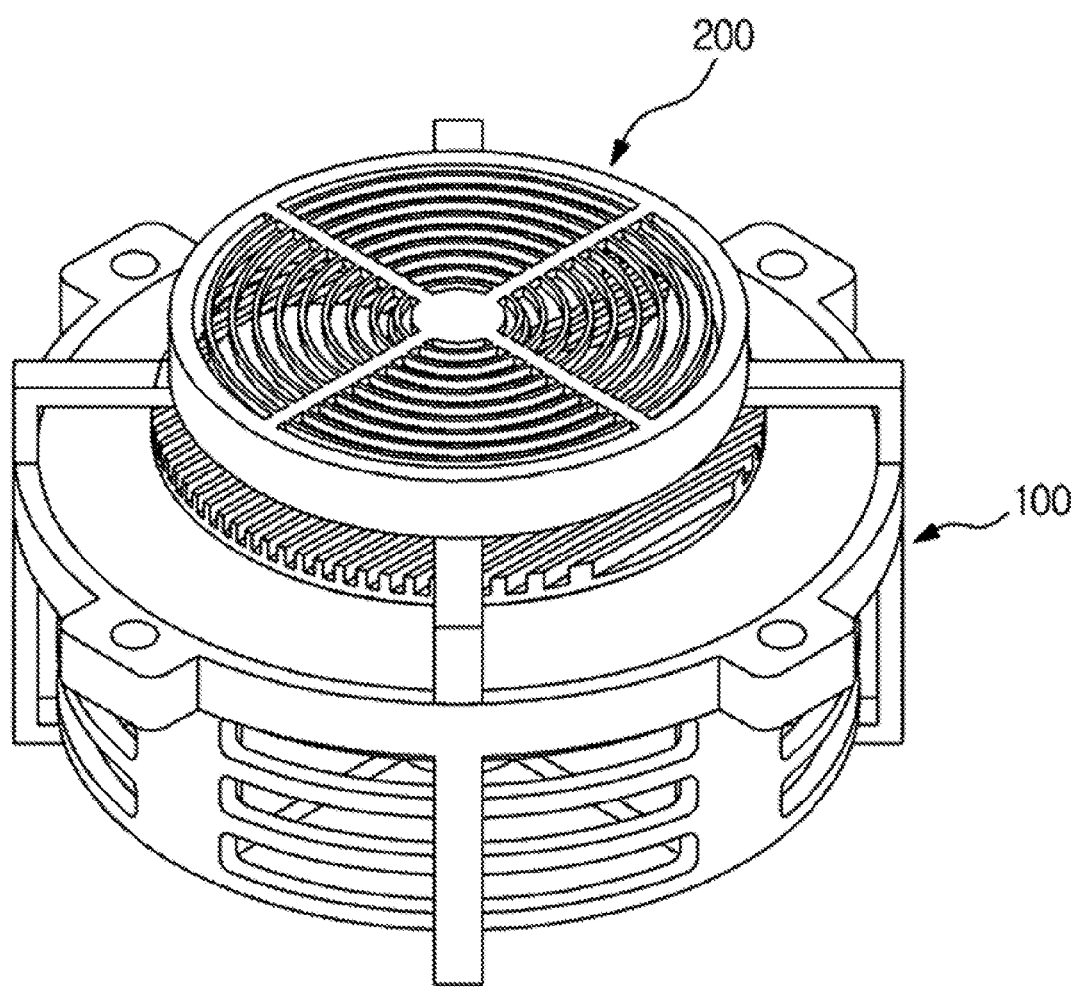
FIG. 1 is a perspective view of a magnetic cooling apparatus and a blower apparatus in accordance with an embodiment.

Reference will now be made in detail to embodiments, examples of which are illustrated in the accompanying drawings, wherein like reference numerals refer to like elements throughout.

Referring to FIG. 1, a magnetic cooling apparatus 100 in accordance with an embodiment is provided at one side thereof with a blower apparatus 200 configured to supply the cool air generated at the magnetic cooling apparatus 100 to the outside.

Figure 2:
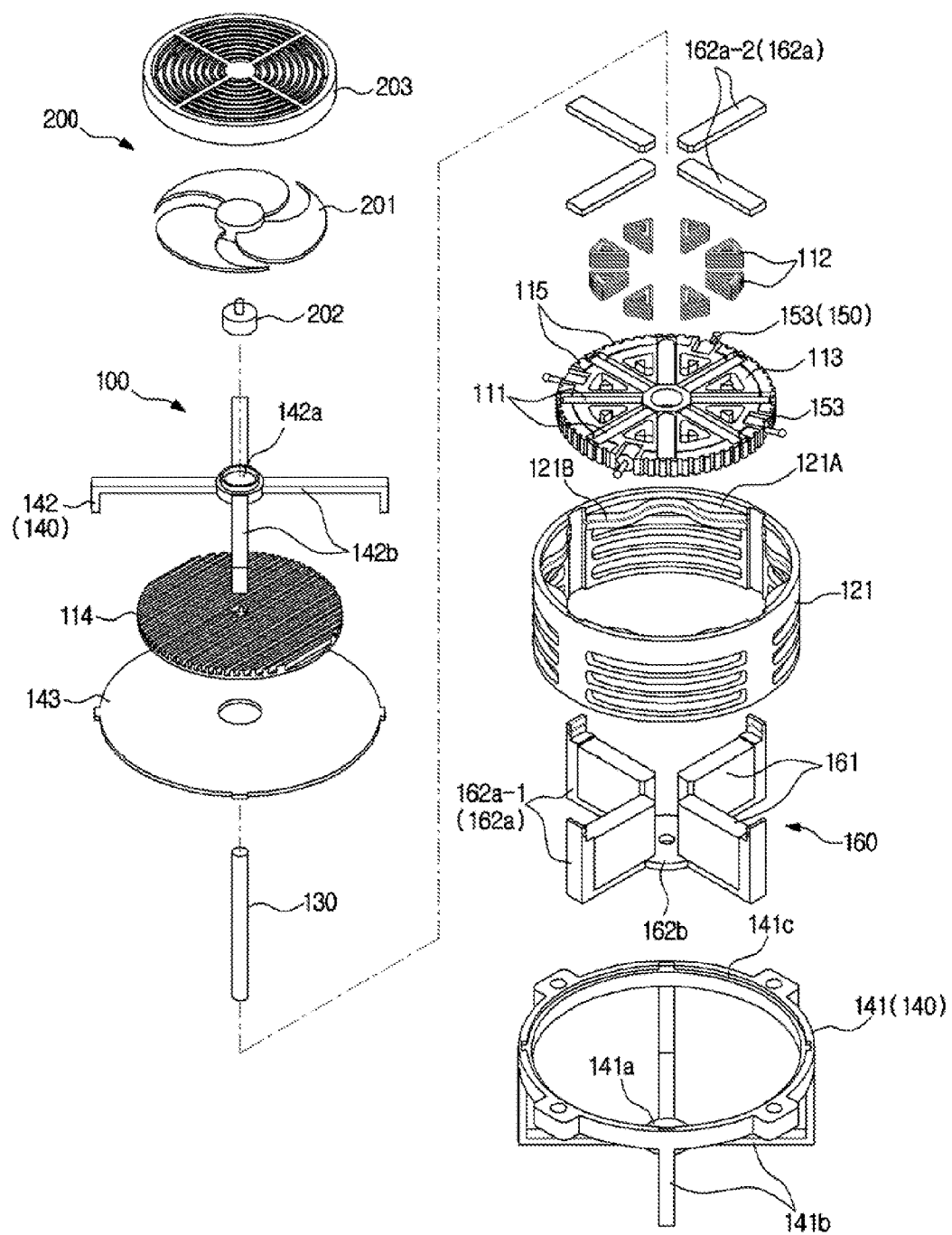
FIG. 2 is an exploded perspective view of the magnetic cooling apparatus and the blower apparatus in accordance with an embodiment.
Figure 3:
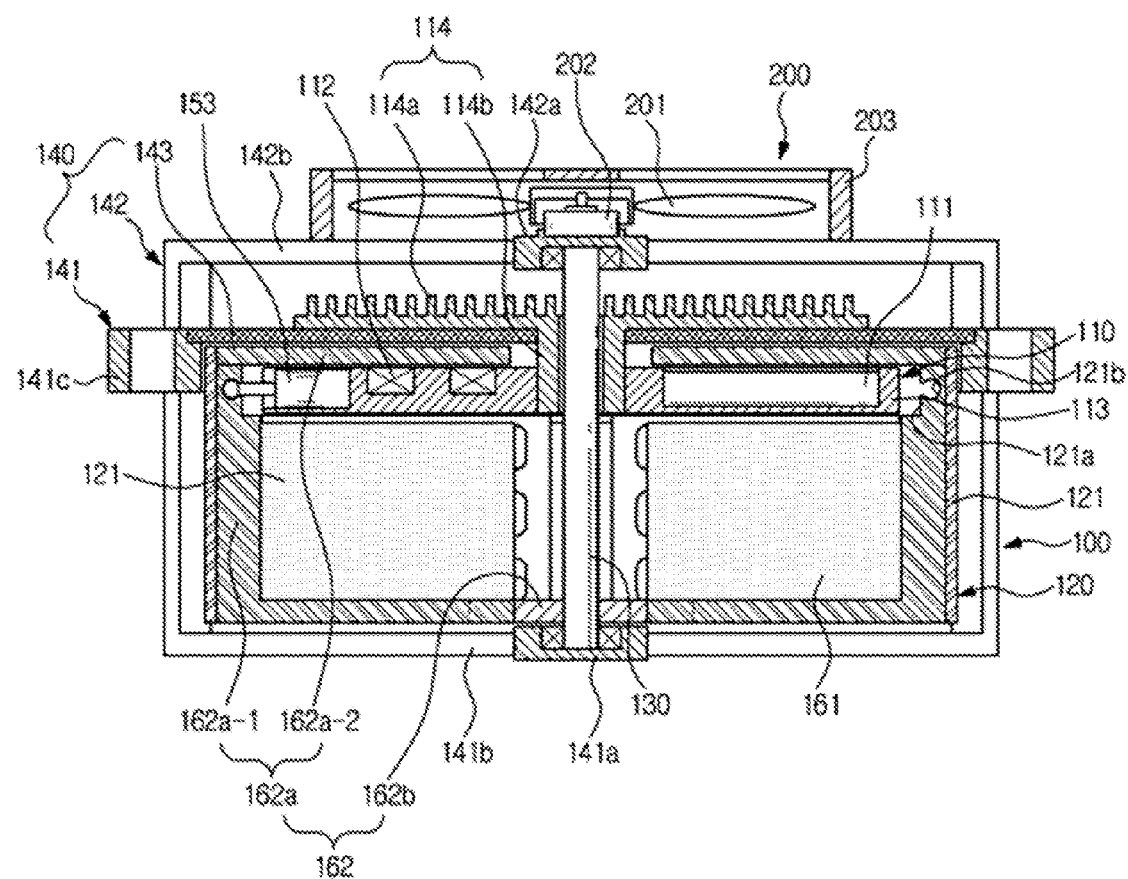
FIG. 3 is a side cross-sectional drawing of the magnetic cooling apparatus and the blower apparatus in accordance with an embodiment.
Figure 4:
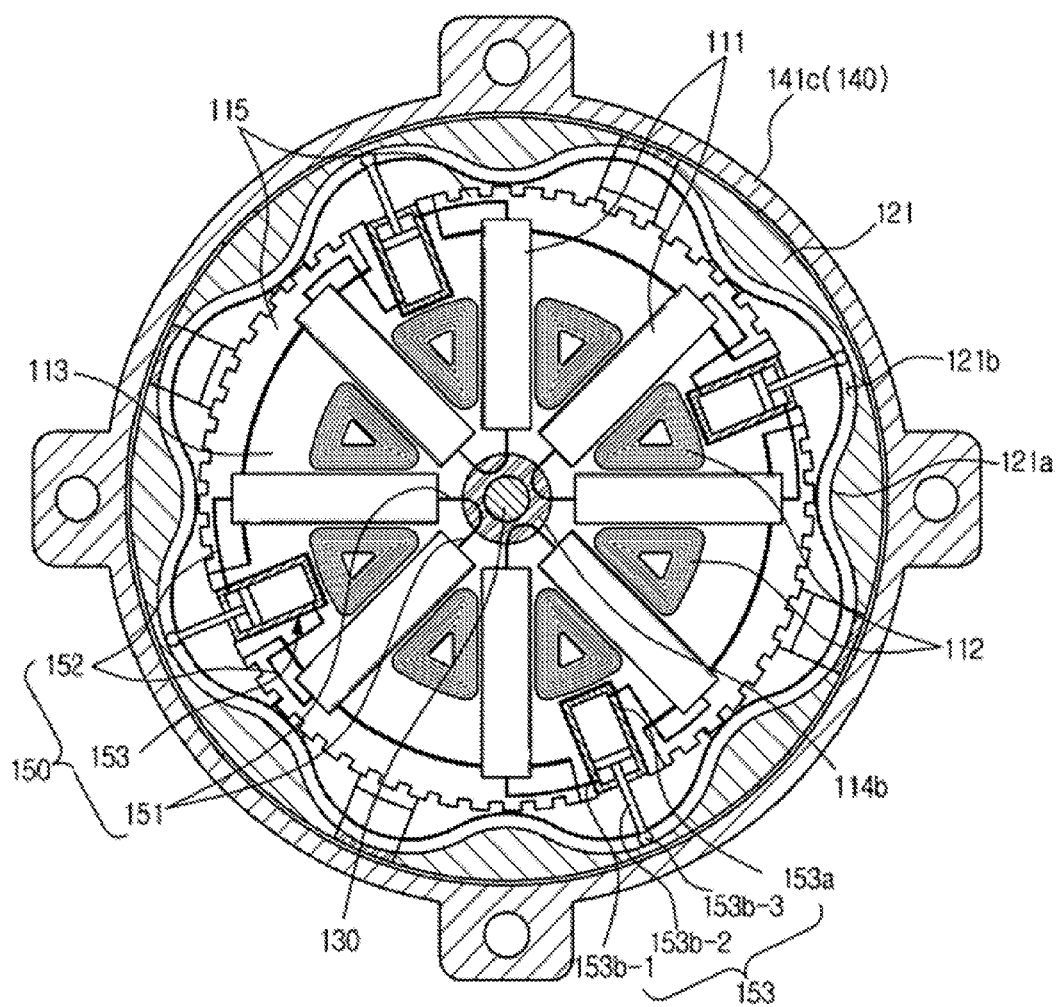
FIG. 4 is a plane cross-sectional drawing of the magnetic cooling apparatus schematically illustrating a flow path structure in accordance with an embodiment

Referring to FIGS. 2 to 4, the magnetic cooling apparatus 100 includes a fixing module 110 fixedly installed, a rotation module 120 rotatably installed at the fixing module 110 and configured to rotate while interacting with the fixing module 110, a shaft 130 fixed at a central portion of the rotation module 120 and rotatably installed at the rotation module 120, and a supporting frame 140 at which the fixing module 110 is fixedly installed and configured to rotatably support the shaft 130.

In addition, the blower apparatus 200 configured to have the cool air generated at the magnetic cooling apparatus 100 supplied to an outside by drafting air is installed at one side of the magnetic cooling apparatus 100.

The fixing module 110 includes a plurality of magnetic regenerators 111 provided such that the temperature thereof is changed depending on whether a magnetic field is applied, a plurality of coils 112 configured to generate a magnetic field as a power is applied, a fixing member 113 configured to support the plurality of magnetic regenerators 111 and the plurality of coils 112 and fixedly installed at the supporting frame 140, a first heat exchanger 114 disposed at one side of the fixing module 110 and configured to be delivered with a thermal fluid that is cooled by the magnetic regenerator 111, and a second heat exchanger 115 configured to be delivered with a thermal fluid that is heated by the magnetic regenerator 111.

The plurality of coils 112 and the plurality of magnetic regenerators 111 are provided with same number of units with respect to each other and are alternately disposed at the fixing member 113 toward a circumferential direction. The eight units of the coils 112 and the eight units of the magnetic regenerator 111 are alternately disposed at the fixing module 110 in an embodiment.

The plurality of coils 112 each is formed as wires are wound, and is disposed toward a circumferential direction while spaced apart with respect to each other. Thus, as a power is applied to the coil 112, a magnetic field is generated at the coil 112, and the magnetic field generated at the coil 112 enables the rotation module 120 to be rotated while interacting with a magnetic field generated at a magnet 161 which is to be described later.

The plurality of magnetic regenerators 111 each is disposed toward a circumferential direction at the fixing module 113 while spaced apart with respect to each other, and a magnetic thermal material is filled at an inside thereof.

In addition, the fixing module 110 includes a thermal fluid supplying apparatus 150 capable of having a thermal fluid delivered from the magnetic regenerator 111 to the first heat exchanger 114 or the second heat exchanger 115.

The thermal fluid supplying apparatus 150 includes a plurality of actuators 153 installed at an end portion of an outer circumferential side of the fixing module 113 such that a thermal fluid may flow along a flow path which is to be described later, and a plurality of flow paths 151 and 152 configured to guide the flow of the thermal fluid. The actuators 153 in one or more embodiments are configured to be moved by use of the rotation module 120.

The plurality of the magnetic regenerators 111 are connected to the first heat exchanger 114, the second heat exchanger 115, and the actuators 153 through the flow paths 151 and 152, such that the thermal fluid that is heat-exchanged with respect to the magnetic thermal material at an inside the magnetic regenerator 111 may be delivered to a side of the first heat exchanger 114 and the second heat exchanger 115.

The magnetic thermal material is referred to as material having characteristics of absorbing heat in a state when a magnetic field is not applied and radiating heat in a case when a magnetic field is applied.

The magnetic regenerator 111 is an apparatus configured to use the characteristics of the magnetic thermal material as such, and is configured to allow a thermal fluid to be heated by using heat generated at the magnetic thermal material when a magnetic field is applied, such that the heated thermal fluid is caused to flow to a high-temperature area, and when the magnetic field being applied to the magnetic thermal material is removed and thus the magnetic thermal material is fallen to a temperature lower than an original temperature, to allow the thermal fluid to be cooled by the cooled magnetic thermal material, and flow the cooled thermal fluid to a low-temperature area.

The fixing member 113 is formed in the approximate shape of a circular panel, and is configured to support the plurality of coils 112 and the plurality of magnetic regenerators 111. A heat delivering unit 114b of the first heat exchanger 114 is installed at a central portion of the fixing member 113, and the second heat exchanger 115 is installed at an outer circumferential surface of the fixing member 113.

The above-described plurality of flow paths 151 and 152 include the plurality of first flow paths 151 capable of having the thermal fluid cooled by the magnetic regenerators 111 delivered to the first heat exchanger 114 by connecting the plurality of magnetic regenerators 111 to the first heat exchanger 114, and the plurality of second flow paths 152 capable of having a thermal fluid flown by the actuators 153 by connecting the plurality of magnetic regenerators 111 to the actuators 153, and also capable of having the thermal fluid heated at the magnetic regenerators 111 delivered at the second heat exchanger 115.

The first flow path 151 in an embodiment is connected to the first heat exchanger 114, and the two units of the first flow path 151 each extended from the two adjacent magnetic regenerators 111 are connected to each other at the first heat exchanger 114.

The second flow path 152 is connected to the actuator 153 after passing through the second heat exchanger 115. The two units of the second flow path 152 each extended from the two adjacent magnetic regenerators 111 are connected to both end portions of the actuator 153 disposed in between the two units of magnetic regenerator 111. That is, the second flow path 152 extended from one of the two adjacent magnetic regenerators 111 is connected to an inner side end of the actuator 153 installed at the fixing member 113 in a radial direction, and the second flow path 152 extended from the other one of the two adjacent magnetic regenerators 111 is connected to an outer side end of the actuator 153. The first flow path 151 and the second flow path 152 in an embodiment each is provided with the total of eight units as to correspond with the magnetic regenerator 111.

As described above, the two units of the first flow path 151 are connected to each other, and the two units of the second flow path 152 are connected to both side ends of the actuator 153, and thus, at the time of when the actuator 153 is in motion, the actuator suctions thermal fluid from a certain one of two adjacent units of the magnetic regenerators 111 and at the same time discharges thermal fluid to the other one of the two adjacent units of the magnetic regenerators 111.

The first heat exchanger 114 includes a heat exchanging unit 114a formed in the shape of a circular panel as to correspond with respect to the fixing member 113, and a heat delivery unit 114b extended from a central portion of the heat exchanging unit 114a and installed at a central portion of the fixing member 113.

The heat exchanging unit 114a is provided at an outer side surface thereof with a concavo-convex unit concavely and convexly formed thereto as to increase a heat exchanging area with respect to air.

The heat delivery unit 114b is installed at a central portion of the fixing member 113, and in which a portion of the first flow path 151 is provided such that the thermal fluid passing through the first flow path 151 may heat-exchange with the first heat exchanger 114 by passing through the heat delivery unit 114b. Since the first flow path 151 in an embodiment is configured to guide the thermal fluid cooled at the magnetic regenerator 111, the first heat exchanger 114 is cooled by the thermal fluid.

The second heat exchanger 115 is formed in the shape of a ring, and is installed at an outer circumferential surface of the fixing member 113 while provided in plurality. The second heat exchanging unit 115 is provided at an outer side surface thereof with a concavo-convex unit concavely and convexly formed thereto as to increase a heat exchanging area with respect to air. A portion of the second flow path 151 is formed at an inside the second heat exchanger 115, and the thermal fluid passing through the second flow path 152 heat-exchanges with the second heat exchanger 115. Since the second flow path 152 in an embodiment is configured to guide the thermal fluid heated at the magnetic regenerator 111, the second heat exchanger 115 is heated by the thermal fluid.

The actuator 153 includes a cylinder 153a formed in the shape of a cylinder and disposed in lengthways in a radial direction at the fixing member 113, and a piston 153b movably installed at the fixing member 113 at an inside the cylinder 153a in a radial direction such that a thermal fluid may flow.

The actuator 153 in an embodiment is designed to discharge thermal fluid to the magnetic regenerator 111 and to suction thermal fluid from the magnetic regenerator 111 that is applied with a magnetic field.

Thus, the thermal fluid that is discharged from the magnetic regenerator 111 through the first flow path 151 is delivered to the first heat exchanger 114 as to cool the first heat exchanger 114, and the thermal fluid that is suctioned to a side of the actuator 153 from the magnetic regenerator 111 is delivered to the second heat exchanger 115 as to heat the second heat exchanger 115.

The above-described first flow path 151 is connected to an inner side end of the cylinder 153a, and the above-described second flow path 152 is connected to an outer side end of the cylinder 153a. Thus, as the piston 153b is moved forwardly/backwardly moved in a radial direction of the fixing member 113, the inlet and the outlet of the thermal fluid are oppositely taken place at the first flow path 151 and the second flow path 152.

The piston 153b includes a piston unit 153b-1 movably installed at an inside the cylinder 153a as to have a thermal fluid flow, a load unit 153b-2 provided with one end thereof connected to the piston unit 153b-1 while extended to an outer side of the cylinder 153a such that an external force may be delivered to the piston unit 153b-1, and a guide unit 153b-3 provided at the other end of the load unit 153b-2 and configured to be inserted into and hooked at a guide rail 121b provided at a cam unit 121a, which is to be described later. The guide unit 153b-3 in an embodiment is formed in the shape of a sphere as to be smoothly moved along the guide rail 121b while in a state of being hooked at the guide rail 153b-3. Thus, according to the rotation of the rotation module 120, the piston 153b is moved forward/backward while interacting with respect to the cam unit 121a.

The rotation module 120 includes the rotation member 121 formed in the shape of a ring being rotatably installed at the fixing member through an shaft, and a magnetic flux generating apparatus 160 disposed at an inner circumferential surface of the rotation member 121 as to generate a magnetic flux.

The magnetic flux generating apparatus 160 includes a plurality of magnets 161 to generate magnetic fields, and a magnetic flux guide member 162 installed at an inside the rotation member 121 and configured to guide the magnetic fields generated at the magnets 161.

The magnet 161 in an embodiment is provided with the total of four units thereof, and the four units of the magnet 161 are provided as to simultaneously apply magnetic fields at the four units of the magnetic regenerator 111 of the above-described eight units of the magnetic regenerator 111 such that the thermal fluid at an inside the magnetic regenerator 111 is heated, or as to have the rotation module 120 rotated while interacting with the four units of the coil 112 of the eight units of the coil 112.

The rotation member 121 is formed in the shape of a ring, and allows an outer side end of the magnetic flux guide member 162 to be installed to an inside of the rotation member 121. The rotation member 121 is provided at an inner circumferential surface thereof with the cam unit 121*a* protruded toward an inner side of a radial direction. The cam unit 121*a* is formed as crest portions and trough portions are alternately provided in a circumferential direction, and the guide rail 121*b* at which the guide unit 153*b*-3 is insertedly supported is provided in a circumferential direction at the cam unit 121*a*.

The guide rail 121*b* in an embodiment is formed in the shape of a groove having a circular cross section such that the guide unit 153*b*-3 of a spherical shape may be inserted into and guided to the guide rail 121*b*, and one side of the guide rail 121*b* is open such that the load unit 153*b*-2 may be passed through the guide rail 121*b*. Thus, when the rotation module 120 is rotated, the piston unit 153*b* is forwardly/backwardly moved toward a radial direction during the process of the guide unit 153*b*-3 passing through the crest portions and the trough portions of the cam unit 121*a*.

The magnetic flux guide member 162 includes four magnetic flux guide units 162*a* each formed in the shape of a letter 'C' and provided at an inside thereof with the magnet 161 installed thereto, and an shaft installation unit 162*b* configured to connect inner side ends of the four magnetic flux guide units 162*a* to each other and at which the shaft 130 is fixed. The magnetic flux guide unit 162*a* in an embodiment is provided to form the 'C' shape as a member 162*a*-2 in the shape of a '-' is provided at an upper side of a 'L' shaped member 162*a*-1, such that that the fixing module 110 may be disposed at an inside of the magnetic flux guide units 162*a*. The fixing module 110 is installed at an inner side of the magnetic flux guide unit 162*a* while spaced apart from the magnetic flux guide unit 162*a* and the magnet 161.

Thus, the actuator 153 is driven as the piston 153*b* is moved forward/backward according to the rotations of the rotation module 120. The cam unit 121*a* in an embodiment is provided to forwardly/backwardly move the piston 153*b* such that thermal fluid is discharged to the magnetic regenerator 111 to which a magnetic field is not applied, and the thermal fluid is suctioned from the magnetic regenerator 111 to which a magnetic field is applied.

The supporting frame 140 includes a first frame 141 and a second frame 142 coupled to each other in an axial direction, and a fixing panel 143 to which the first heat exchanger 114 and the fixing member 113 are fixed.

The first frame 141 and the second frame 142 each includes hub units 141*a* and 142*a* at which both ends of the shaft 130 are rotatably installed, respectively, and supporting units 141*b* and 142*b* disposed at outer sides of the rotation module 120 while extended from the hub unit 141*a* and 142*a* in the shape of a letter 'L', and a fixing unit 141*c* formed in the shape of a circular ring is provided at end portion of the supporting unit 141*b* of the first frame 141 such that and the supporting units 141*b* of the first frame 141 are connected to the fixing unit 141*c*, and the fixing panel 143 and the supporting unit 142*b* of the second frame 142 are fixed to the fixing unit 141*c*.

The shaft 130 is fixed to the shaft installation unit 162*b* of the rotation module 120, and after penetrating through the fixing member 113, the first heat exchanger 114, and the fixing panel 143, the both ends of the shaft 130 are rotatably installed at the hub units 141*a* and 141*b* of the first frame 141 and the second frame 142, respectively, and thus the shaft 130 is rotatably installed at the rotation module 120.

The blower apparatus 200 includes a draft fan 201 to draft air while rotating, a fan motor 202 configured to rotate the draft fan 201, and a draft case 203 configured to accommodate the fan motor 202 at an inside thereof and provided in the shape of a grill such that air is passed through.

In an embodiment, the rotation module 120 is provided to be rotated by interaction of the coils 112 and the magnets 161, but is not limited hereto, and the rotation module 120 may be able to be rotated by use of a separate motor.

Next, motions of the magnetic cooling apparatus structured as such accordance with one or more embodiments will be described in detail by referring to the drawings.

First, when a power is applied to the coils 112 in the state of when the magnets 161 are facing with respect to the four units of the coils 112 of the eight units of the coils 112, the magnetic field generated at the coils 112 interact with the magnetic field generated at the magnet 161, and accordingly, the rotation module 120 is rotated.

Since the four units of the magnets 161 may only be simultaneously faced with respect to only four of the magnetic regenerators 111, magnetic fields are applied only to four of the magnetic regenerators 111 while magnetic fields are not applied to the remaining four of the magnetic regenerators 111. In addition, since the rotation module 120 is continually rotated, each magnetic regenerator 111 is repeated with a state of a magnetic field being applied and a state of a magnetic field not being applied.

Figure 5:
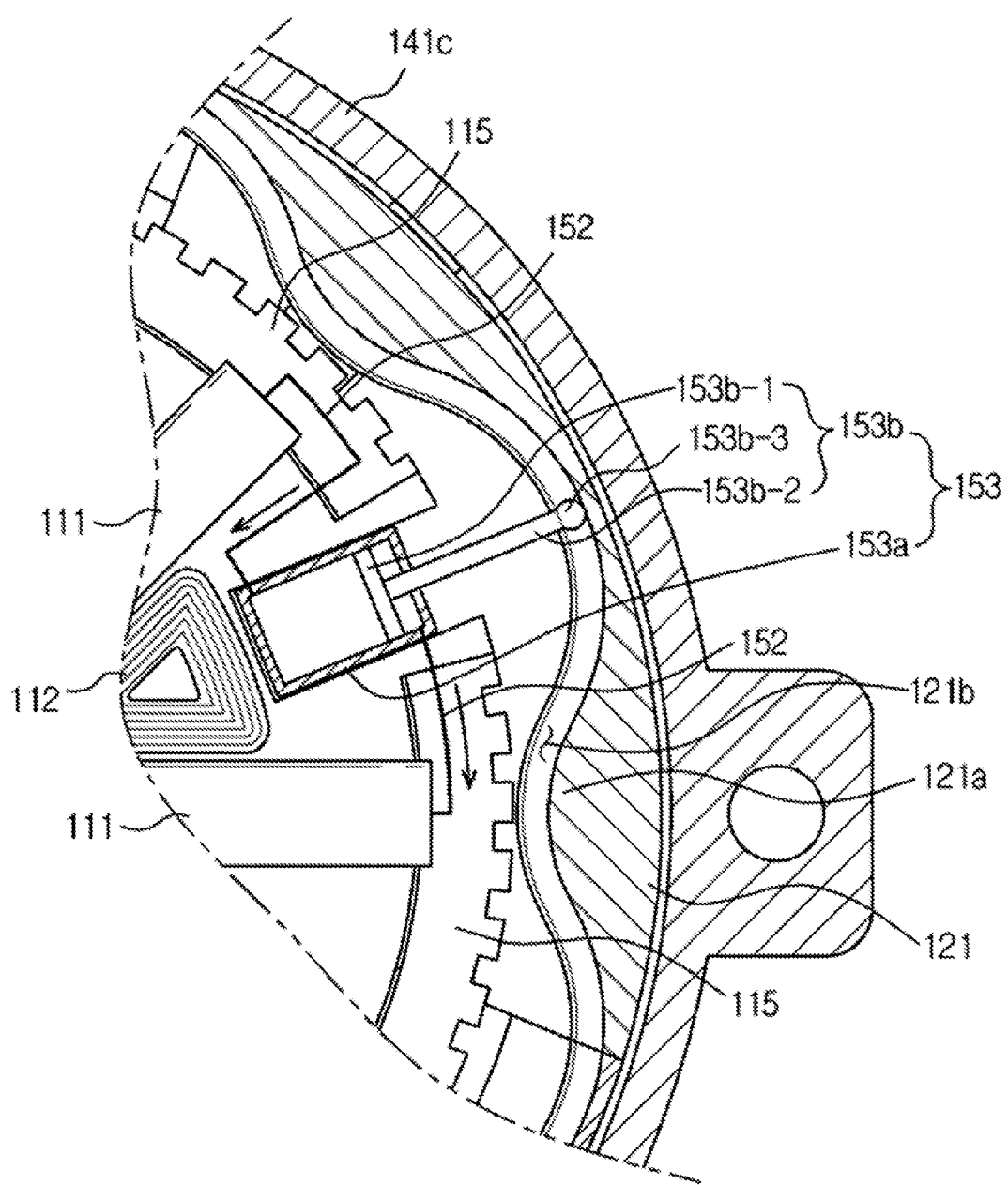
FIG. 5 and FIG. 6 are drawings showing a flow of thermal fluid according to operation of an actuator with respect to a magnetic cooling apparatus in accordance with an embodiment.
Figure 6:
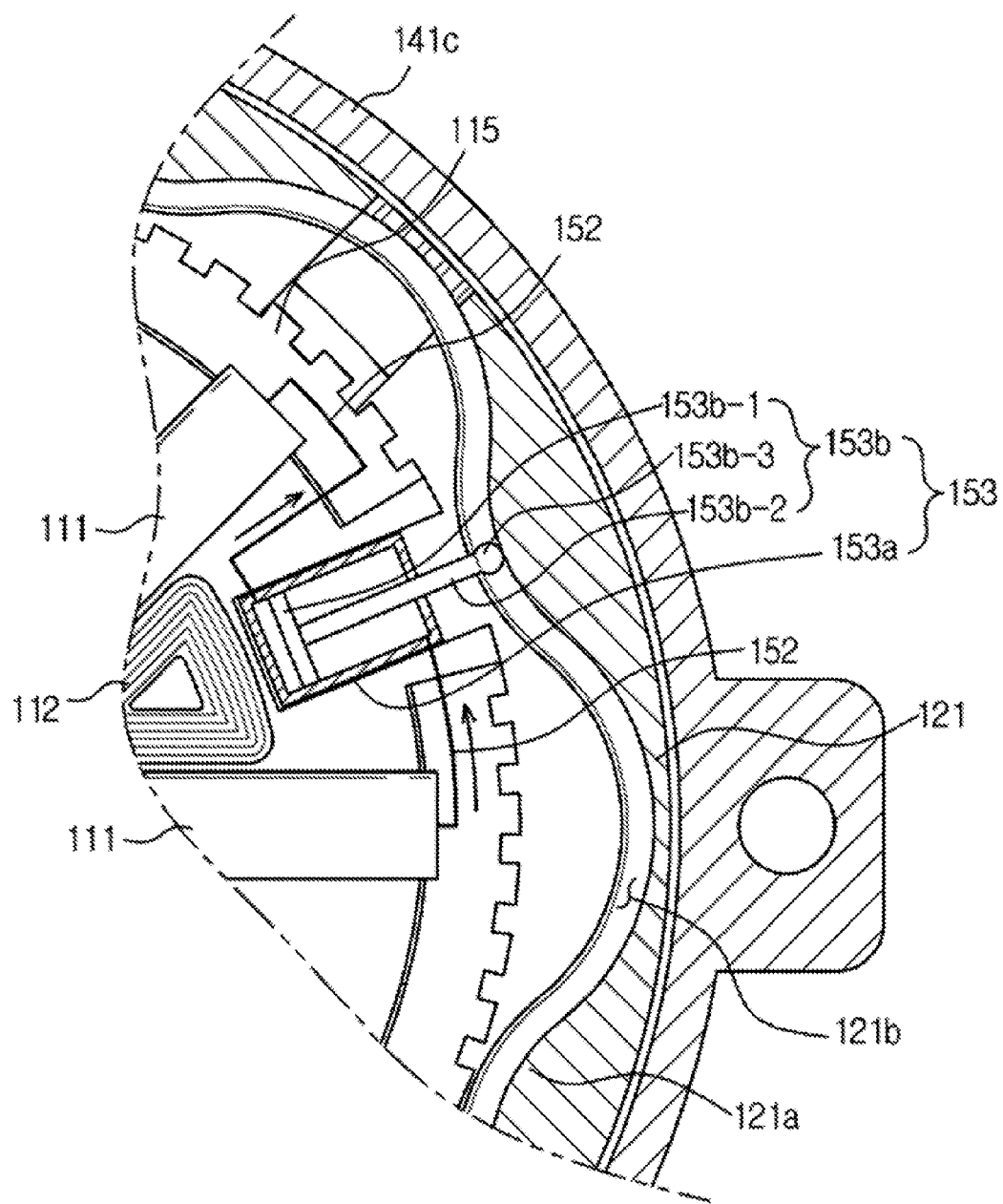

As the above, in the process of the state of a magnetic field being applied and the state of a magnetic field not being applied are repeated at the each magnetic regenerator 111, the actuator 153 as illustrated on FIG. 5 and FIG. 6 suction thermal fluid from the magnetic regenerator 111 having applied with a magnetic field among the two units of the magnetic regenerators 111, and discharges thermal fluid to the magnetic regenerator 111 not having applied with a magnetic field.

Since the magnetic thermal material at an inside the magnetic regenerator 111 having applied with a magnetic field is provided to generate heat, the thermal fluid passing through the magnetic regenerator 111 having applied with a magnetic field is heated, and the heated thermal fluid is suctioned to the second flow path 152 by the actuator 153. The second flow path 152 is provided as to pass through the second heat exchanger 115, and thus the second heat exchanger 115 is heated by the thermal fluid passing through the second flow path 152.

In addition, the temperature of the magnetic thermal material at an inside the magnetic regenerator 111 having not applied with a magnetic field is decreased, the thermal fluid passing through the magnetic regenerator 111 having not provided with a magnetic field is cooled, and the cooled thermal fluid is discharged from the magnetic regenerator 111 to the first flow path 151 by the actuator 153. As the first flow path 151 is provided as to pass through the heat delivery unit 114b of the first heat exchanger 114, the first heat exchanger 114 is cooled by the thermal fluid passing through the first flow path 151.

Since the blower apparatus 200 is adjacently disposed with respect to the first heat exchanger 114, the air being inlet by use of the blower apparatus 200 is cooled while passing through the first heat exchanger 114 and then is discharged by the blower apparatus 200, the cool air is supplied to an outer side by use of the blower apparatus 200.

A magnetic cooling apparatus in accordance with an embodiment will be described in detail by referring to FIGS. 7 and 8.

Figure 7:
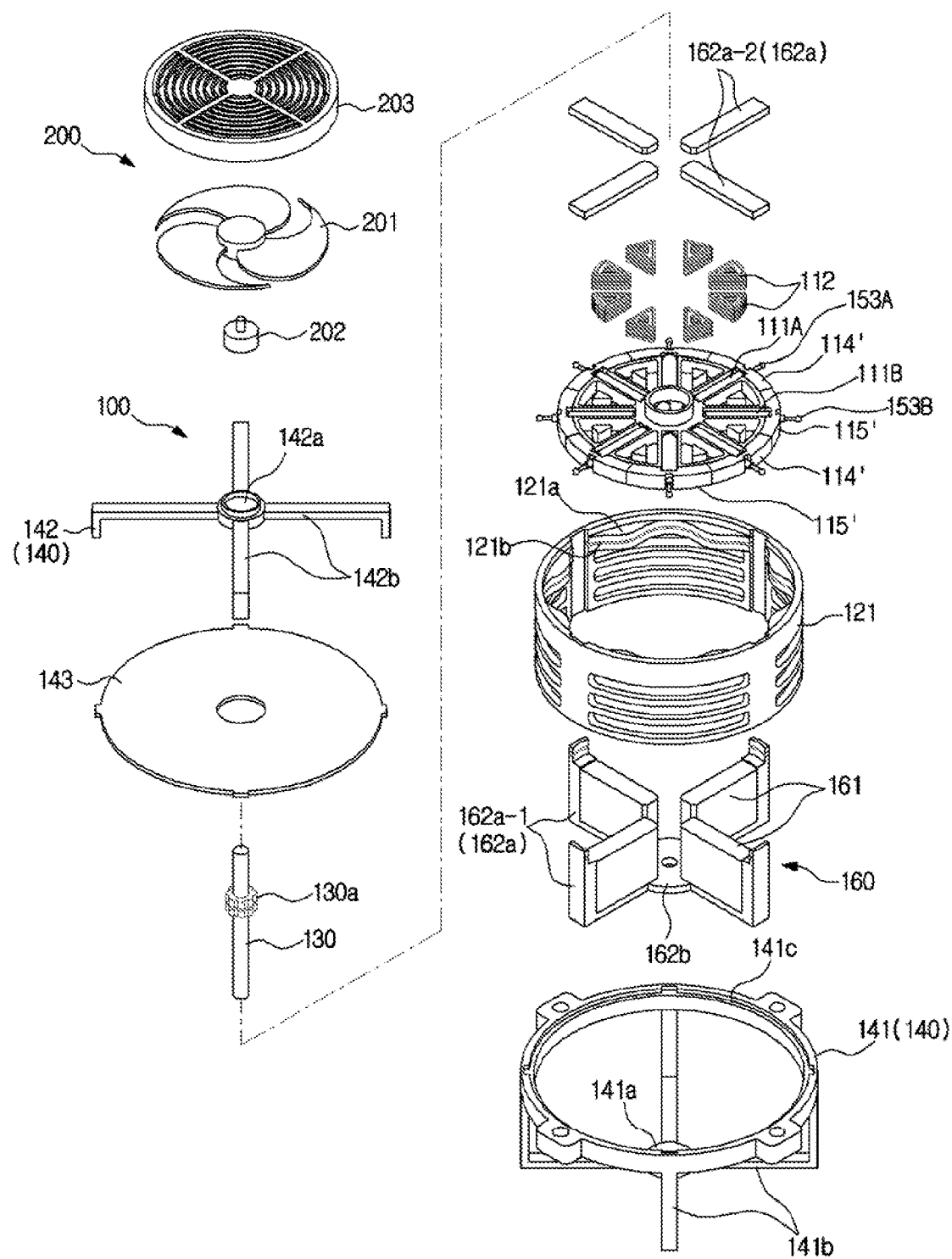
FIG. 7 is an exploded perspective view of the magnetic cooling apparatus and a blower apparatus in accordance with an embodiment.
Figure 8:
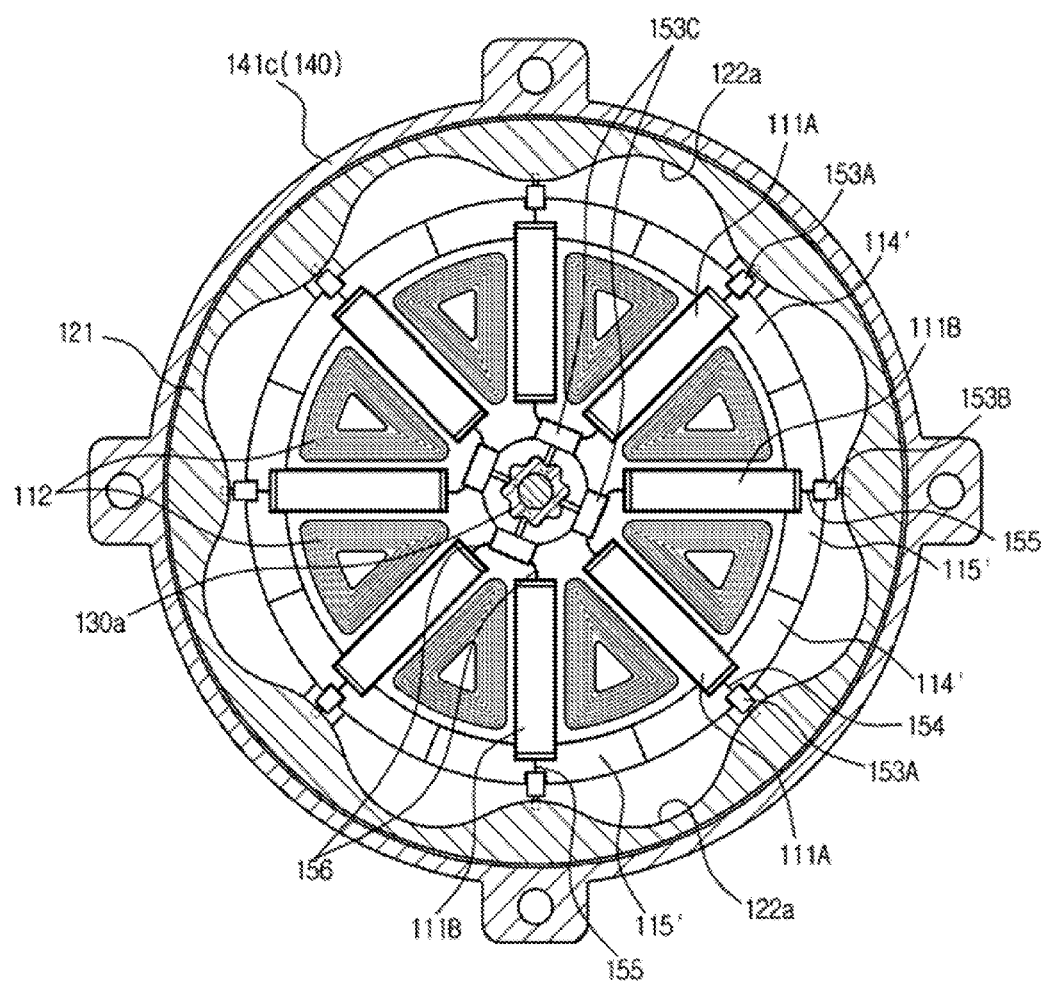
FIG. 8 is a plane cross-sectional drawing of the magnetic cooling apparatus schematically illustrating a flow path structure in accordance with an embodiment.

As illustrated in FIG. 7 and FIG. 8, a magnetic cooling apparatus 100 is structured in a similar structure when compared to embodiments in FIGS. 2-6. However, the actuator 153, heat exchangers 114' and 115', cam units 121a and 131a, and flow paths 154, 155, and 156 in embodiments in FIGS. 7 and 8 may be different embodiments of actuators, heat exchangers, cam units and flow paths than in FIGS. 2-6.

The heat exchanger 114' and 115' in an embodiment each is provided in the shape of an arc, and includes a plurality of first heat exchangers 114' and a plurality of second heat exchangers 115' alternately disposed at an outer circumferential surface of the fixing member 113.

Magnetic regenerators 111A and 111B include a plurality of first magnetic regenerators 111A disposed at a position corresponding to the first heat exchangers 114' and a plurality of second magnetic regenerators 111B disposed at a position corresponding to the second heat exchangers 115', and the magnetic regenerators 111A and 111B are alternately disposed at the fixing member 113 in a circumferential direction.

The actuator 153 includes a plurality of first actuators 153A and a plurality of second actuators 153B disposed at an outer side of a radial direction of the fixing member 113 and configured to interact with the first cam unit 121a of the rotation member 121, and a third actuator 153C disposed at an inner side of a radial direction of the fixing member 113 and configured to interact with a second cam unit 130a provided at the shaft 130.

The first cam unit 121a in an embodiment is configured such that the pistons 153b of the first actuators 153A and the second actuators 153B are simultaneously forwardly/backwardly moved, and the second cam unit 130a is configured such that the pistons 153b of the third actuators 153C are forwardly/backwardly moved however in contrary with respect to the pistons 153b of the first actuators 153A and the second actuators 153B. Thus, in a case when a thermal fluid is suction by the first actuators 153A and the second actuators 153B, the third actuator 153C discharges a thermal fluid, and in a case when a thermal fluid is discharged by the first actuators 153A and the second actuators 153B, the third actuator 153C suctions a thermal fluid.

The flow paths 154, 155, and 156 include (1) a plurality of first flow paths 154 which are provided at the first heat exchanger 114' and configured to connect the plurality of first actuators 153A to each outer side ends of the each of the plurality of magnetic regenerators 111A and 111B, (2) a plurality of second flow paths 155 which are provided at the second heat exchanger 115', and configured to connect the plurality of second actuators 153B to the each of the plurality of magnetic regenerators 111A and 111B, and (3) a plurality of third flow paths 156 which are configured to connect the third actuator 153C to inner side ends of the first heat exchanger 114' and the second heat exchanger 115' adjacent to each other.

The first actuators 153A in an embodiment are configured such that in a case when magnetic fields are not applied to the first magnetic regenerators 111A, a thermal fluid is suctioned by the first actuators 153A so that the thermal fluid cooled at the first magnetic regenerators 111A is delivered to the first heat exchanger 114', and the second actuators 153B are configured such that in a case when magnetic fields are applied to the 오역 second magnetic regenerators 111A, a thermal fluid is suctioned by the second actuators 153B so that the thermal fluid heated at the second magnetic regenerators 111B is delivered to the second heat exchanger 115'.

In addition, in the contrary, the first actuator 153A is configured such that in a case when magnetic fields are applied to the first magnetic regenerators 111A, a thermal fluid is discharged so that the thermal fluid having heat-exchanged at the first heat exchanger 114' is again delivered to the first magnetic regenerators 111A, and the second actuator 153B is configured such that in a case when magnetic fields are not applied to the second magnetic regenerators 111B, a thermal fluid is discharged so that the thermal fluid having heat thereof discharged at the second heat exchanger 115' is again delivered to the second magnetic regenerators 111B.

At this time, the third actuator 153C is provided to act in contrary to the first actuator 153A and the second actuator 153B. That is, in a case when the first actuator 153A and the second actuator 153B suction a thermal fluid, the third actuator 153C discharges a thermal fluid, and in a case when the first actuator 153A and the second actuator 153B discharges a thermal fluid, the third actuator 153C suctions a thermal fluid. The thermal fluid being discharged from 불필요 the first actuator 153A and the second actuator 153B is mixed at the third actuator 153C as to form a thermal equilibrium, and thus no separate method of heat exchanging is needed.

As the processes as above are repeated, the first heat exchanger 114' and the second heat exchanger 115' are accumulated with cool air and heated air, respectively.

Thus, the first heat exchanger 114' is capable of generating cool air while cooled by thermal fluid, and the second heat exchanger 115' is heated by a thermal fluid and then is cooled while heat exchanging with air.

In addition, although not illustrated on the drawings, heat delivery members provided such that the cool air generated at the first heat exchanger 114' and the heated air generated at the second heat exchanger 115' are separated and then divided into separate spaces may be included at the magnetic cooling apparatus.

Figure 9:
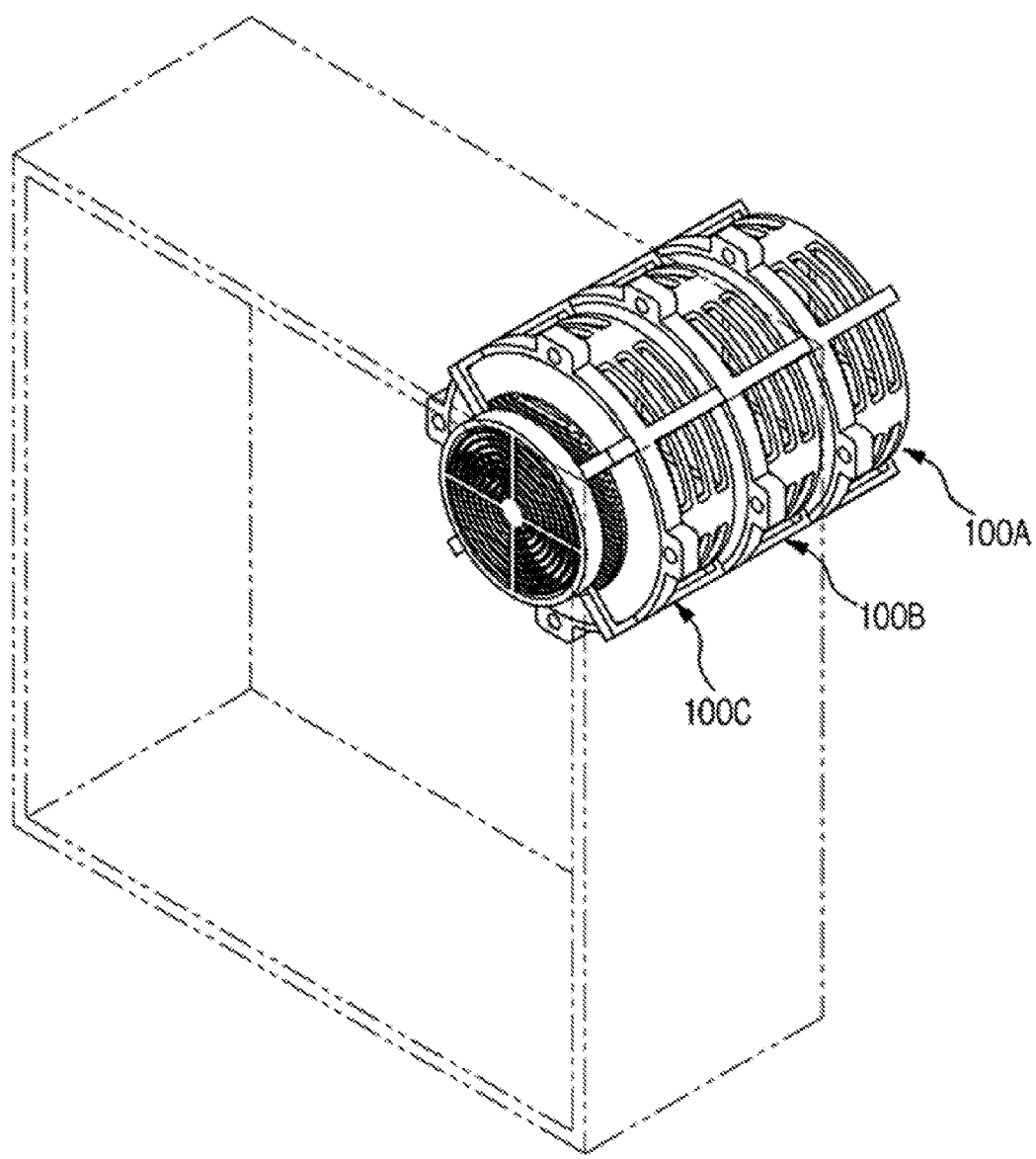
FIG. 9 is a perspective view illustrating an example of a refrigerating system having a magnetic cooling apparatus in accordance with an embodiment.
Figure 10:
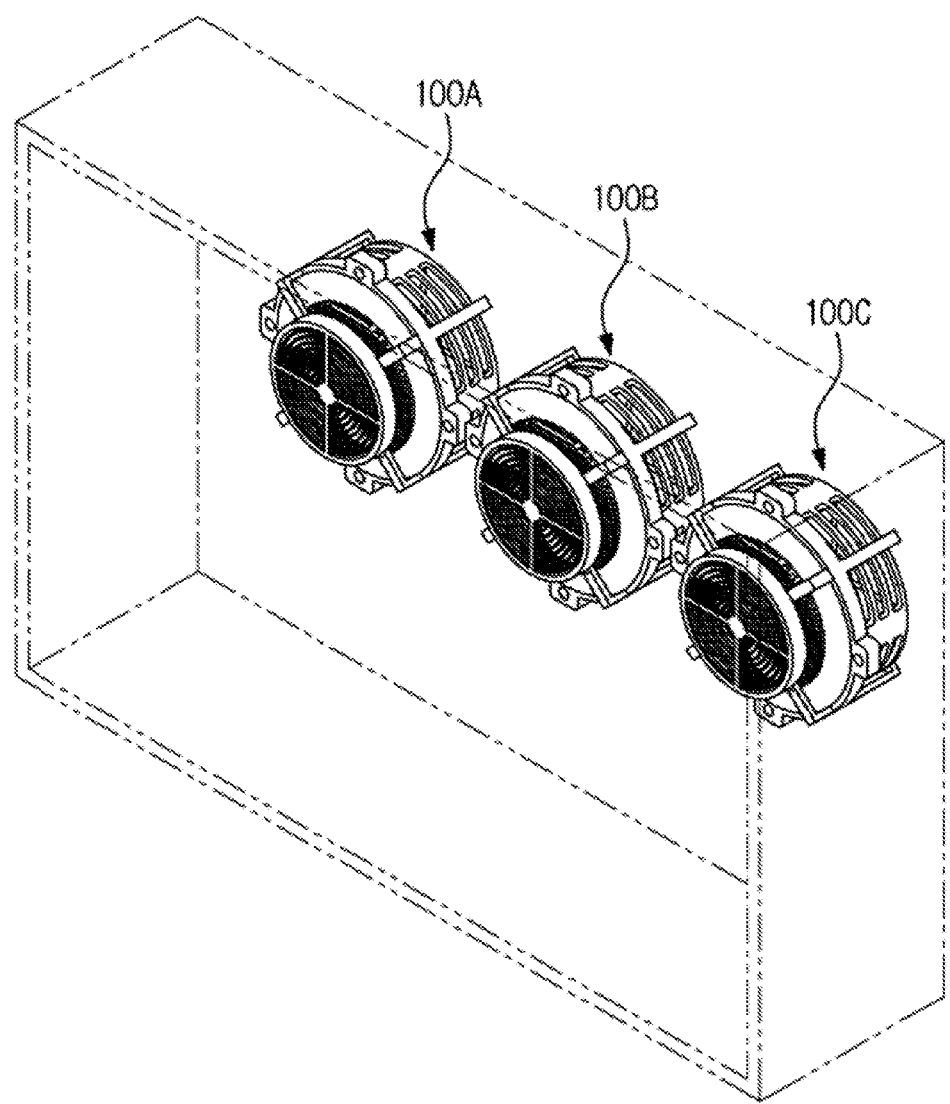
FIG. 10 is a perspective view illustrating another example of a refrigerating system having a magnetic cooling apparatus in accordance with an embodiment.

In addition, as illustrated on FIG. 9 and FIG. 10, a refrigerating system through a plurality of magnetic cooling apparatuses 100A, 100B, and 100C may be structured.

As illustrated on FIG. 9, by structuring a refrigerating system while disposing in an axial direction the plurality of magnetic cooling apparatuses 100A, 100B, and 100C each having different range of motions, a larger range of temperature change may be provided when compared to an individual magnetic cooling apparatus, so that a certain space may be cooled at a further lower temperature.

As one example, the magnetic cooling apparatus 100A positioned at a far rear side on the drawing is provided as to include a magnetic thermal material having a range of temperature change between about 5° C. and about 3° C., the magnetic cooling apparatus 100B positioned at a central portion on the drawing is provided as to include a magnetic thermal material having a range of temperature change between about 30° C. and about 0° C., and the magnetic cooling apparatus 100C positioned at a far front side on the drawing is provided as to include a magnetic thermal material having a range of temperature change between about 0° C. and about −20° C., so that the refrigerating apparatus formed by use of the three units of the plurality of magnetic cooling apparatuses 100A, 100B, and 100C may be provided with a temperature capable of refrigerating in a range of temperature change between about 50° C. and about −20° C.

In addition, as illustrated on FIG. 10, a refrigerating capacity is increased by parallelly disposing the plurality of magnetic cooling apparatuses 100A, 100B, and 100C, so that a certain space may be refrigerated to a certain temperature at a shorter period of time.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A magnetic cooling apparatus, comprising:
    a fixing module, and
    a rotation module configured to rotate with respect to the fixing module,
    wherein the fixing module comprises:
        a plurality of magnetic regenerators spaced apart from each other in a circumferential direction of the fixing module;
        a plurality of coils alternately disposed with the plurality of magnetic regenerators in the circumferential direction;
        a first heat exchanger installed at one side of the fixing module and configured to receive thermal fluid which is cooled by the plurality of magnetic regenerators; and
        a second heat exchanger installed at an outer circumferential side of the fixing module and configured to receive the thermal fluid which is heated by the plurality of magnetic regenerators, and
    wherein the rotation module comprises a magnetic flux generator having a plurality of magnets to apply magnetic flux to the plurality of magnetic regenerators and is configured to be rotated according to an interaction between the plurality of coils and the plurality of magnets to allow thermal fluid to exchange heat with the plurality of magnetic regenerators.

2. The magnetic cooling apparatus of claim 1, further comprising a thermal fluid supplier configured to be operated by the rotation module and to allow thermal fluid to exchange heat with the plurality of magnetic regenerators, the thermal fluid supplier comprises a first flow path to allow the thermal fluid to be delivered from one of the magnetic regenerators to the first heat exchanger, a second flow path allowing the thermal fluid to be delivered from the one magnetic regenerator to the second heat exchanger, and an actuator to allow the thermal fluid to flow through the first flow path and the second flow path.

3. The magnetic cooling apparatus of claim 2, wherein:
    the actuator is configured to flow the thermal fluid of a magnetic regenerator applied with a magnetic field among the plurality of magnetic regenerators to the second heat exchanger, and configured to flow the thermal fluid of a magnetic regenerator not applied with a magnetic field among the plurality of magnetic regenerators to the first heat exchanger.

4. The magnetic cooling apparatus of claim 2, wherein:
    the first flow path comprises two separate first flow paths thereof and extended from inner side ends of two adjacent magnetic regenerators among the plurality of magnetic regenerators are connected to each other at the first heat exchanger;
    the second flow path comprises two separate second flow paths thereof and one of the second flow paths extended through the second heat exchanger from an outer side end of one of the two adjacent magnetic regenerators is connected to an outer side end of the actuator; and
    the other one of the second flow paths extended through the second heat exchanger from an outer side end of another one of the two adjacent magnetic regenerators is connected to an inner side end of the actuator.

5. The magnetic cooling apparatus of claim 2, wherein:
    the rotation module comprises a rotation member formed in the shape of a ring, and a cam unit provided at an inner surface of the rotation member, and the actuator is driven by the cam unit.

6. The magnetic cooling apparatus of claim 5, wherein:
    the cam unit is provided with crest portions and trough portions, which are alternately formed from the inner surface of the rotation member in a circumferential direction of the cam unit.

7. The magnetic cooling apparatus of claim 6, wherein:
    the actuator comprises a cylinder disposed in a radial direction at the fixing module, and a piston movably installed at the cylinder.

8. The magnetic cooling apparatus of claim 7, wherein:
    the cam unit comprises a guide rail provided in a circumferential direction of the cam unit, and
    the piston comprises a guide unit inserted into and hooked at the guide rail.

9. The magnetic cooling apparatus of claim 8, wherein:
    the guide unit is formed in the shape of a sphere, and the guide rail is formed in the shape of a groove having a circular cross section as to correspond to the guide unit.

10. The magnetic cooling apparatus of claim 5, wherein:
    the fixing module comprises a fixing member formed in the shape of a circular panel and to allow the plurality of magnetic regenerators installed thereon and being spaced apart each other in a circumferential direction of the fixing module, and
    the magnetic flux generator disposed at an inner circumferential surface of the rotation member.

11. The magnetic cooling apparatus of claim 10, wherein:
    the magnetic flux generator comprises a magnet configured to generate magnetic field and a magnetic flux guide unit formed in the shape of a letter C and provided with the magnet installed at an inner side of the magnetic flux guide unit, and
    the fixing member is disposed and spaced apart from the magnet and the magnetic flux guide unit.

12. The magnetic cooling apparatus of claim 1, wherein:
    the fixing module comprises a plurality of first heat exchangers configured to receive cool air, and a plurality of second heat exchangers configured to receive heated air, and
    the plurality of first heat exchangers and the plurality of second heat exchangers are alternately disposed at an outer circumferential side of the fixing module in a circumferential direction.

13. The magnetic cooling apparatus of claim 1, wherein:
the plurality of magnetic regenerators comprises at least one first magnetic regenerator configured to cool thermal fluid and at least one second magnetic regenerator configured to heat thermal fluid.

14. The magnetic cooling apparatus of claim 13, wherein:
the thermal fluid supplying apparatus comprises a first flow path connecting an outer side end of the first magnetic regenerator to the first heat exchanger, a second flow path connecting an outer side end of the second magnetic regenerator to the second heat exchanger, a third flow path extended from inner side ends of the first magnetic regenerator and the second magnetic regenerator, a first actuator configured as to flow thermal fluid though the first flow path, a second actuator configured as to flow thermal fluid though the second flow path, and a third actuator connected to the third flow path, which is provided in two units thereof and extended from the first magnetic regenerator and the second magnetic regenerator that are adjacent to each other.

15. The magnetic cooling apparatus of claim 14, wherein:
the rotation module comprises a rotational shaft and a rotation member formed in the shape of a ring, and
the rotation member comprises a first cam unit protruded from an inner surface of the rotation member and provided with crest portions and trough portions alternately formed in a circumferential direction, and
the rotational shaft comprises a second cam unit protruded from an outer surface of the rotation shaft and provided with crest portions and trough portions alternately formed in a circumferential direction.

16. The magnetic cooling apparatus of claim 15, wherein:
the first actuator and the second actuator are driven by the first cam unit, and the third actuator is driven by the second cam unit.

17. The magnetic cooling apparatus of claim 15, wherein:
the first actuator, the second actuator, and the third actuator each comprises a cylinder disposed in a radial direction at the fixing module and a piston movably installed at the cylinder.

18. The magnetic cooling apparatus of claim 17, wherein:
the first cam unit and the second cam unit each comprises a guide rail provided in a circumferential direction, and
the piston provided at each of the first actuator, the second actuator, and the third actuator comprises a guide unit inserted into and hooked at the guide rail.

19. The magnetic cooling apparatus of claim 18, wherein:
the guide unit is formed in the shape of a sphere, and the guide rail is formed in the shape of a groove having a circular cross section as to correspond to the guide unit.

20. The magnetic cooling apparatus of claim 15, wherein:
the fixing module comprises a fixing member formed in the shape of a circular panel and having the plurality of magnetic regenerators installed thereon in a circumferential direction, and
the rotation module comprises a magnetic flux generating apparatus disposed at an inner circumferential surface of the rotation member and configured to apply a magnetic flux to the plurality of magnetic regenerators.

21. The magnetic cooling apparatus of claim 20, wherein:
the fixing member further comprises a plurality of coils alternately disposed with the plurality of magnetic regenerators in a circumferential direction, and
the rotation module is configured to be rotated according to interaction between the plurality of coils and the plurality of magnetic flux generating apparatuses.

22. The magnetic cooling apparatus of claim 14, wherein:
the first actuator is configured to flow thermal fluid to the first flow path when a magnetic field is not applied to the first magnetic regenerator,
the third actuator is configured to flow thermal fluid to the third flow path when a magnetic field is applied to the first magnetic regenerator,
the second actuator is configured to flow thermal fluid to the second flow path when a magnetic field is applied to the second magnetic regenerator, and
the third actuator is configured to flow thermal fluid to the third flow path when a magnetic field is not applied to the second magnetic regenerator.

23. The magnetic cooling apparatus of claim 22, wherein:
the third actuator is configured to mix the thermal fluid being delivered from the two units of third flow paths connected to the first magnetic regenerator and the second magnetic regenerator.

24. The magnetic cooling apparatus of claim 22, wherein:
the first actuator and the second actuator are configured to simultaneously draw and discharge thermal fluid,
the third actuator is configured to draw thermal fluid when the first actuator and the second actuator discharge thermal fluid; and
the third actuator is configured to discharge thermal fluid when the first actuator and the second actuator draw thermal fluid.

25. A magnetic refrigerating system comprising a plurality of units of the magnetic cooling apparatus according to claim 1, wherein:
the plurality of magnetic cooling apparatuses are serially disposed in an axial direction of the magnetic refrigerating system.

26. The magnetic refrigerating system of claim 25, wherein:
each of the plurality of magnetic cooling apparatuses is provided with a different temperature range of operation.

27. A magnetic refrigerating system comprising a plurality of units of the magnetic cooling apparatus according to claim 1, wherein:
the plurality of units of the magnetic cooling apparatus are parallelly disposed as to be positioned at side directions with respect to each other.

28. A magnetic cooling apparatus, comprising:
a fixing module, and
a rotation module configured to rotate with respect to the fixing module,
wherein the fixing module comprises:
  a plurality of magnetic regenerators spaced apart from each other in a circumferential direction;
  a plurality of coils alternately disposed with the plurality of magnetic regenerators in a circumferential direction;
  a first heat exchanger disposed at a central portion of the plurality of magnetic regenerators and configured to receive thermal fluid that is cooled at the magnetic regenerators;
  a second heat exchanger disposed at an outer circumferential side of the fixing module and configured to receive thermal fluid that is heated at the magnetic regenerators; and
  a thermal fluid supplier to allow thermal fluid to be delivered from the magnetic regenerators to the first heat exchanger and the second heat exchanger, wherein the thermal fluid supplier comprises:
- a first flow path to connect the magnetic regenerator to the first heat exchanger;
- a second flow path to connect the magnetic regenerator to the second heat exchanger; and
- an actuator to allow thermal fluid to flow through the first flow path and the second flow path, and
- wherein the rotation module comprises a magnetic flux generator having a plurality of magnets to apply magnetic flux to the plurality of magnetic regenerators and is configured to be rotated according to an interaction between the plurality of coils and the plurality of magnets.

29. The magnetic cooling apparatus of claim 28, wherein:
the rotation module comprises a rotation member formed in a shape of a ring, and a cam unit provided at an inner surface of the rotation member and provided with crest portions and trough portions which are alternately formed toward a circumferential direction; and
the actuator is driven by the cam unit.

30. The magnetic cooling apparatus of claim 28, wherein:
the first flow path having two separate first flow paths thereof and extended from inner side ends of two adjacent magnetic regenerators among the plurality of magnetic regenerators are connected to each other at the first heat exchanger;
the second flow path having two separate second flow paths thereof and one of the second flow paths extended through the second heat exchanger from an outer side end of one of the two adjacent magnetic regenerators is connected to an outer side end of the actuator, and
the other one of the second flow paths extended through the second heat exchanger from an outer side end of the other one of the two magnetic regenerators is connected to an inner side end of the actuator.

31. The magnetic cooling apparatus of claim 28, wherein:
the rotation module comprises a plurality of magnets to generate magnetic fields, and a plurality of magnetic flux guide units formed in a shape of a letter C and provided at an inside thereof with the magnets installed thereto.

32. A magnetic refrigerating system comprising a plurality of units of the magnetic cooling apparatus according to claim 28, wherein:
the plurality of magnetic cooling apparatuses are serially disposed in an axial direction of the magnetic refrigerating system.

33. A magnetic refrigerating system comprising a plurality of units of the magnetic cooling apparatus according to claim 28, wherein:
the plurality of magnetic cooling apparatuses are parallelly disposed as to be positioned at side directions with respect to each other.

* * * * *